US010793148B2

(12) United States Patent
Kim et al.

(10) Patent No.: US 10,793,148 B2
(45) Date of Patent: Oct. 6, 2020

(54) APPARATUS AND METHOD FOR CONTROLLING DRIVING OF VEHICLE

(71) Applicants: HYUNDAI MOTOR COMPANY, Seoul (KR); KIA MOTORS CORPORATION, Seoul (KR); Pusan National University Industry-University Cooperation Foundation, Busan (KR)

(72) Inventors: Nam Han Kim, Bucheon-si (KR); Chang Sun Ahn, Busan (KR)

(73) Assignees: HYUNDAI MOTOR COMPANY, Seoul (KR); KIA MOTORS CORPORATION, Seoul (KR); PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 29 days.

(21) Appl. No.: 16/179,151

(22) Filed: Nov. 2, 2018

(65) Prior Publication Data
US 2020/0055517 A1    Feb. 20, 2020

(30) Foreign Application Priority Data
Aug. 20, 2018    (KR) .......................... 10-2018-0096908

(51) Int. Cl.
*B60W 30/09* (2012.01)
*B60W 30/095* (2012.01)
(Continued)

(52) U.S. Cl.
CPC ............. *B60W 30/09* (2013.01); *B60Q 9/008* (2013.01); *B60T 7/22* (2013.01); *B60W 10/18* (2013.01);
(Continued)

(58) Field of Classification Search
None
See application file for complete search history.

(56) References Cited

U.S. PATENT DOCUMENTS

2009/0326820 A1* 12/2009 Shimizu .................... B60T 7/22
                                                                  701/301
2013/0226408 A1*  8/2013 Fung ...................... B60W 40/09
                                                                  701/41
(Continued)

FOREIGN PATENT DOCUMENTS

KR    10-1665451 B1    10/2016

*Primary Examiner* — Tamara L Weber
(74) *Attorney, Agent, or Firm* — Brinks Gilson & Lione

(57) ABSTRACT

An apparatus for controlling driving of a vehicle is provided. The apparatus includes: a sensor to sense an environment outside of the vehicle, a positioning device to measure a current position of the vehicle, and a controller to calculate a first weighted time to collision with another vehicle using an accident severity index obtained based on the environment outside the vehicle and the current position of the vehicle and to control collision avoidance based on the calculated first weighted time to collision. The apparatus performs strong control to avoid a collision in an external environment incapable of being sensed by a sensor, thus reducing occurrence of an accident of the vehicle and damage due to the accident of the vehicle.

16 Claims, 13 Drawing Sheets

(51) Int. Cl.
  *B60T 7/22*      (2006.01)
  *B60W 10/18*     (2012.01)
  *B60W 10/20*     (2006.01)
  *B60W 50/14*     (2020.01)
  *B60Q 9/00*      (2006.01)

(52) U.S. Cl.
  CPC ........ *B60W 10/20* (2013.01); *B60W 30/0953* (2013.01); *B60W 30/0956* (2013.01); *B60W 50/14* (2013.01); *B60T 2201/022* (2013.01); *B60W 2420/42* (2013.01); *B60W 2554/00* (2020.02); *B60W 2555/20* (2020.02); *B60W 2556/60* (2020.02)

(56) References Cited

U.S. PATENT DOCUMENTS

| | | | |
|---|---|---|---|
| 2014/0195120 A1 | 7/2014 | McClain et al. | |
| 2016/0150070 A1* | 5/2016 | Goren | H04W 4/029 455/404.2 |
| 2017/0236210 A1* | 8/2017 | Kumar | B60W 10/30 705/4 |
| 2017/0241791 A1* | 8/2017 | Madigan | G06Q 40/08 |

* cited by examiner

| ACCIDENT TYPE | DAY/NIGHT | TOTAL | DAY | NIGHT |
|---|---|---|---|---|
| TOTAL | | 4119 | 2047 | 2072 |
| VEHICLE VS PERSON | SUBTOTAL | 1647 | 612 | 1035 |
| | CROSSING | 1078 | 409 | 669 |
| | PASSING A ROADWAY | 146 | 42 | 104 |
| | PASSING THE EDGE OF A STREET | 65 | 23 | 42 |
| | PASSING A SIDEWALK | 30 | 18 | 12 |
| | OTHERS | 328 | 120 | 208 |
| VEHICLE VS VEHICLE | SUBTOTAL | 1646 | 676 | 670 |
| | COLLISION | 942 | 619 | 323 |
| | REAR-END COLLISION | 436 | 222 | 214 |
| | OTHERS | 268 | 135 | 133 |
| VEHICLE ONLY | SUBTOTAL | 826 | 459 | 367 |
| | OVERTURN/ROLLOVER | 480 | 281 | 199 |
| | COLLISION | 231 | 105 | 126 |
| | FALLING | 30 | 19 | 11 |
| | OTHER DEVIATIONS | 16 | 12 | 4 |
| | OTHERS | 69 | 42 | 27 |

FIG. 2A

| ROAD ALIGNMENT | DAY/NIGHT | | TOTAL | DAY | NIGHT |
|---|---|---|---|---|---|
| TOTAL | | | 4119 | 2047 | 2072 |
| CURVE | SUBTOTAL | | 691 | 377 | 314 |
| | LEFT | ASCENT | 56 | 35 | 21 |
| | | DESCENT | 86 | 27 | 29 |
| | | FLATLAND | 195 | 100 | 49 |
| | LEFT | ASCENT | 57 | 26 | 31 |
| | | DESCENT | 107 | 60 | 47 |
| | | FLATLAND | 190 | 99 | 91 |
| STRAIGHT LINE | SUBTOTAL | | 3385 | 1641 | 1744 |
| | ASCENT | | 208 | 93 | 115 |
| | DESCENT | | 267 | 148 | 119 |
| | FLATLAND | | 2910 | 1400 | 1510 |
| | | | 43 | 29 | 14 |

FIG.2B

APPARATUS AND METHOD FOR CONTROLLING DRIVING OF VEHICLE

CROSS-REFERENCE TO RELATED APPLICATION

This application claims priority to and the benefit of Korean Patent Application No. 10-2018-0096908, filed on Aug. 20, 2018, the entire contents of which are incorporated herein by reference.

FIELD

The present disclosure relates to an apparatus and method for controlling driving of a vehicle.

BACKGROUND

The statements in this section merely provide background information related to the present disclosure and may not constitute prior art.

When a preceding vehicle decelerates or stops, or when an obstruction such as a pedestrian appears suddenly, although there is no active instruction of a driver, an autonomous emergency braking (AEB) system in a vehicle detects the preceding vehicle or the obstruction and determine a critical situation to warn the driver of the critical situation or control to decelerate automatically. In addition, the AEB system brakes the vehicle itself to prevent a rear-end collision or minimize damage according to the rear-end collision.

It is desired to mount the AEB system for the purpose of reducing pedestrian injuries and fatalities in Europe. AEB is included officially as a vehicle safety assessment from 2014 in a Euro new car assessment program (NCAP).

Referring to the recently released advanced emergency braking system (AEBS) requirements of the Euro NCAP, although a vehicle is traveling at the speed of 20 to 60 km/h, it is desired to detect the risk of a collision with the pedestrian whose walking speed is 3 to 8 km/h.

However, we have discovered that there is a technical limitation in detecting the sudden appearance of a pedestrian while a vehicle is traveling at the speed of 20 km/h or more to determine whether to collide with the pedestrian, determining that there is a possibility that a collision will occur, and decelerating and braking rapidly within a short time. Particularly, it is difficult to detect a pedestrian when the pedestrian is hidden by an external vehicle which is parking, so it is very difficult to satisfy AEBS requirements of the Euro NCAP. Thus, it is difficult to detect an external situation using only a sensor and prevent a collision with a vehicle.

SUMMARY

The present disclosure addresses the above-mentioned problems occurring in the prior art while advantages achieved by the prior art are maintained intact.

An aspect of the present disclosure provides an apparatus and a method for controlling driving of a vehicle to calculate a time when a vehicle is controlled and an amount of control of the vehicle by determining a current driving state using a sensor and calculating a time to collision in which an accident severity obtained from a server is reflected based on an accident risk according to the number of traffic fatalities in the past and a relative position.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a vehicle may include: a sensor configured to sense an environment outside of the vehicle, a positioning device configured to measure a current position of the vehicle, and a controller configured to calculate a first weighted time to collision with another vehicle based on an accident severity index obtained based on the environment outside of the vehicle and the current position of the vehicle and to control collision avoidance based on the calculated first weighted time to collision.

The environment outside of the vehicle may include at least one of brightness, an obstruction, or weather outside of the vehicle.

The accident severity index may be calculated based on a number of fatalities and a collision risk, which occur in the environment outside of the vehicle and the current position of the vehicle.

The collision risk may be calculated based on the number of fatalities according to a collision position and a collision direction of an accident vehicle which occurs in the current position of the vehicle.

The controller may be configured to control at least one of a warning light and a warning sound, when the first weighted time to collision is greater than a first time.

The controller may be configured to reduce engine power or generate a braking jerk, when the first weighted time to collision is greater than a second time and is less than or equal to a first time.

The controller may be configured to control braking torque to decelerate, when the first weighted time to collision is less than or equal to a second time and when there is no driver steering input.

The controller may be configured to calculate a second weighted time to collision in which the accident severity index is reflected upon deceleration in a state where a driver steers, and configured to calculate a third weighted time to collision in which an accident severity index is reflected upon deceleration in a state where the driver does not steer, when the first weighted time to collision is less than or equal to the second time and when there is the driver steering input.

The controller may be configured to assist the driver to steer to decelerate, when the second weighted time to collision is greater than the third weighted time to collision.

The controller may be configured to suppress the driver steering input to decelerate, when the second weighted time to collision is less than or equal to the third weighted time to collision.

The controller may be configured to control a smart cruise control setting speed based on the accident severity index.

According to another aspect of the present disclosure, a method for controlling driving of a vehicle may include: sensing, by a sensor, an environment outside of the vehicle; measuring, by a positioning device, a current position of the vehicle; obtaining, by a controller, an accident severity index based on the environment outside of the vehicle and the current position of the vehicle; calculating, by the controller, a first weighted time to collision with another vehicle based on the accident severity index; and controlling, by the controller, collision avoidance based on the first weighted time to collision.

The accident severity index may be calculated based on a number of fatalities and a collision risk, which occur in the environment outside of the vehicle and the current position of the vehicle.

The collision risk may be calculated based on the number of fatalities according to a collision position and a collision direction of an accident vehicle which occurs in the current position of the vehicle.

The controlling collision avoidance based on the first weighted time to collision may include controlling at least one of a warning light and a warning sound, when the first weighted time to collision is greater than a first time.

The controlling the collision avoidance based on the first weighted time to collision may include reducing engine power or generating a braking jerk, when the first weighted time to collision in which the accident severity index is reflected is greater than a second time and is less than or equal to the first time.

The controlling the collision avoidance based on the first weighted time to collision may include controlling braking torque to decelerate, when the first weighted time to collision in which the accident severity index is reflected is less than or equal to the second time and when there is no driver steering input.

The controlling the collision avoidance based on the first weighted time to collision may include: calculating a second weighted time to collision in which the accident severity index is reflected upon deceleration in a state where a driver steers; and calculating a third weighted time to collision in which the accident severity index is reflected upon deceleration in a state where the driver does not steer, when the first weighted time to collision in which the accident severity index is reflected is less than or equal to the second time and when there is a driver steering input.

The method may further include assisting, by the controller, the driver to steer to decelerate, when the second weighted time to collision is greater than the third weighted time to collision.

The method may further include suppressing, by the controller, the driver steering input to decelerate, when the second weighted time to collision is less than or equal to the third weighted time to collision.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2A is a table illustrating the number of fatal accidents according to an accident type;

FIG. 2B is a table illustrating the number of fatal accidents according to road alignment;

Figure 1:
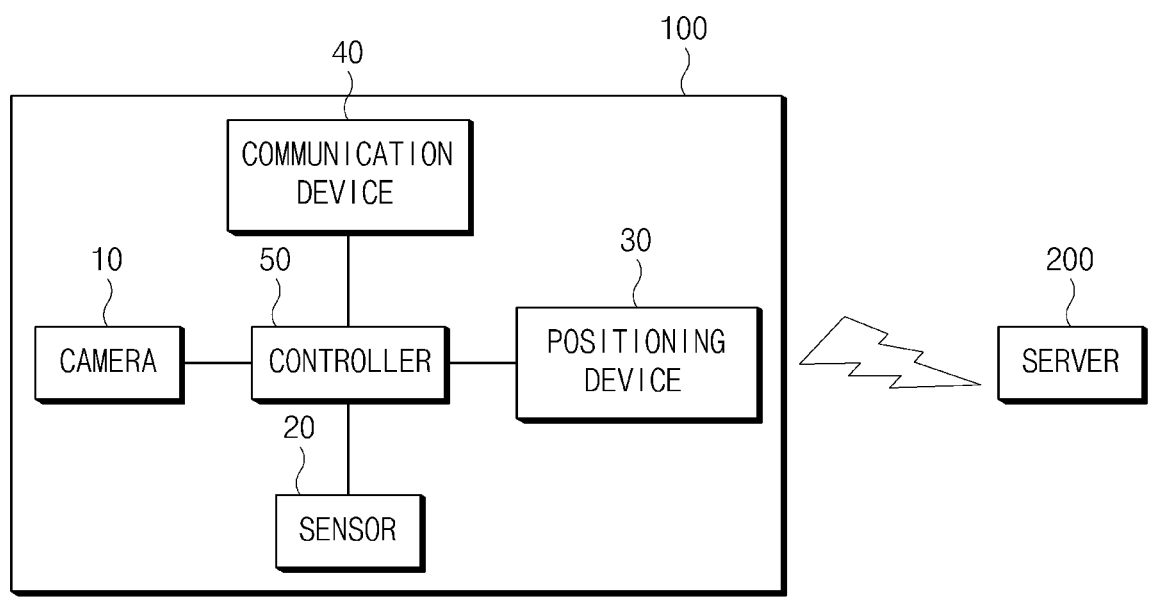
FIG. 1 is a block diagram illustrating a configuration of an apparatus for controlling driving of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding reference denotations to elements of each drawing, although the same elements are displayed on a different drawing, it should be noted that the same elements have the same denotations. In addition, in describing one form of the present disclosure, if it is determined that a detailed description of related well-known configurations or functions blurs the gist of one form of the present disclosure, it will be omitted.

In describing elements of forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for controlling driving of a vehicle in one form of the present disclosure. An apparatus 100 for controlling driving of a vehicle according to an exemplary form of the present disclosure may include a camera 10, a sensor 20, a positioning device 30, a communication device 40, and a controller 50. According to one form, the apparatus 100 for controlling the driving of the vehicle may be applied to an autonomous vehicle.

Referring to FIG. 1, the camera 10 may capture an environment outside the vehicle. In detail, the camera 10 may obtain a position for an obstruction located outside the vehicle. To this end, the camera 10 may include a front super-wide-angle camera for capturing an image in front of the vehicle, a rear super-wide-angle camera for capturing an image behind the vehicle, and left and right super-wide-angle cameras for capturing images to the left and right of the vehicle. When the camera 10 obtains images in front of, behind, and to the left and right of the vehicle, there is no limit to a position where the camera 10 is installed or the number of cameras.

The sensor 20 may sense an environment outside the vehicle. Herein, the environment outside the vehicle may include brightness, an obstruction, weather, or the like outside the vehicle. The sensor 20 may be implemented with a plurality of sensors.

For example, the sensor 20 may include a rain sensor, an illumination sensor, a distance sensor, or the like.

The rain sensor may sense a speed and an amount of rainwater. In detail, when rainwater falls on a front surface of the vehicle, the rain sensor may sense a speed and an amount of rainwater. In other words, weather outside the vehicle may be sensed using the rain sensor. In one form, when there is no rain, the rain sensor may output "0". When rain or snow falls, the rain sensor may output "1".

The illumination sensor may sense brightness outside the vehicle. Thus, the illumination sensor may distinguish day or night. According to an exemplary form, the illumination sensor may output "0" during the day and may output "1" during the night. The illumination sensor may sense brightness outside the vehicle and may turn on/off an auto light. When the auto light is turned on, the illumination sensor may output "1".

The distance sensor may sense an obstruction outside the vehicle. For example, the distance sensor may sense a preceding vehicle which is traveling in front of the vehicle, a stop object including a structure installed on or around a road, a lane approaching from an opposite lane, or the like. The distance sensor may include a radar or a light detection and ranging (LiDAR).

The positioning device 30 may measure a current position of the vehicle. The positioning device 30 may be implemented as a global positioning system (GPS) module. The GPS module may calculate a current position of the vehicle using signals transmitted from 3 or more GPS satellites. The GPS module may calculate a distance between a satellite and the GPS module using a time difference between a time when the satellite transmits a signal and a time when the GPS module receives the signal. The GPS module may calculate a current position of the vehicle using the calculated distance between the satellite and the GPS module and position information of the satellite, included in the transmitted signal. In this case, the GPS module may calculate the current position of the vehicle using triangulation. The positioning device 30 may verify whether the vehicle is currently located on at least one of a flatland, an ascent, and a descent. According to one form, when the vehicle is located on the flatland, the positioning device 30 may output "1". When the vehicle is located on the ascent, the positioning device 30 may output "2". When the vehicle is located on the descent, the positioning device 30 may output "3".

The communication device 40 may communicate with a server 200. The communication device 40 may transmit information about the environment outside the vehicle, sensed by the sensor 20, and information about the current position of the vehicle, measured by the positioning device 30, to the server 200. Furthermore, the communication device 40 may receive the number of traffic fatalities which occur in the environment outside the vehicle, sensed by the sensor 20, and the current position of the vehicle, measured by the positioning device 30, from the server 200. Furthermore, the communication device 40 may receive a collision risk calculated based on the number of traffic fatalities which occur according to a collision position and a collision direction upon an accident using vehicle accident data stored in the server 200. Herein the vehicle accident data may include data for providing detailed statistics of vehicle accidents which occurred in the past.

The controller 50 may determine the environment outside the vehicle and the current position of the vehicle, measured by the positioning device 30, based on information sensed by the sensor 20.

The controller 50 may determine that a host vehicle is traveling on a descent, that it is not raining now, and that it is now night, or that a vehicle slower than the host vehicle is traveling in front of the host vehicle, based on the environment outside the host vehicle, sensed by the sensor 20.

The controller 50 may determine whether the vehicle is entering an intersection or whether the vehicle is traveling on an ascent, a descent, or a curved road, based on the current position of the vehicle, measured by the positioning device 30.

The controller 50 may control the communication device 40 to receive the number of traffic fatalities which occur in the environment outside the vehicle, sensed by the sensor 20, and the current position of the vehicle, measured by the positioning device 30, based on vehicle accident data stored in the server 200. A detailed description will be given with reference to FIGS. 2A and 2B.

FIG. 2A is a table illustrating the number of fatal accidents according to an accident type. FIG. 2B is a table illustrating the number of fatal accidents according to road alignment.

As shown in FIG. 2A, a server 200 of FIG. 1 may receive information about an environment (e.g., a position, weather, or time) outside a vehicle, sensed by a sensor 20 of FIG. 1, and information about a current position of the vehicle, measured by a positioning device 30 of FIG. 1, and may search for an accident type which may occur in the environment around the vehicle. Furthermore, when receiving information indicating that brightness outside the vehicle is bright, the server 200 may search for the number of traffic fatalities, which occur due to collision accidents during the day, as 619.

As shown in FIG. 2B, when receiving information indicating that a vehicle is traveling on a right ascent lane of a curved road and that brightness outside the vehicle is bright, the server 200 may determine whether an accident occurs in such an environment and may search for the number of traffic fatalities which occur in the environment.

A controller 50 of FIG. 1 may calculate a collision risk according to a collision position and a collision direction of an accident vehicle which occurs in the environment outside the vehicle, sensed by the sensor 20, based on vehicle accident data stored in the server 200. Herein, the collision risk may be calculated based on the number of traffic fatalities according to a collision position and a collision direction where an accident occurs. A detailed description will be given with reference to FIGS. 3A and 3B.

Figure 3A:
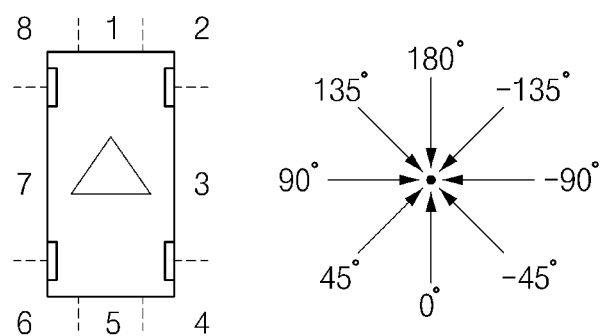
FIG. 3A is a drawing illustrating a collision direction and a collision position of an accident vehicle.
Figure 3B:
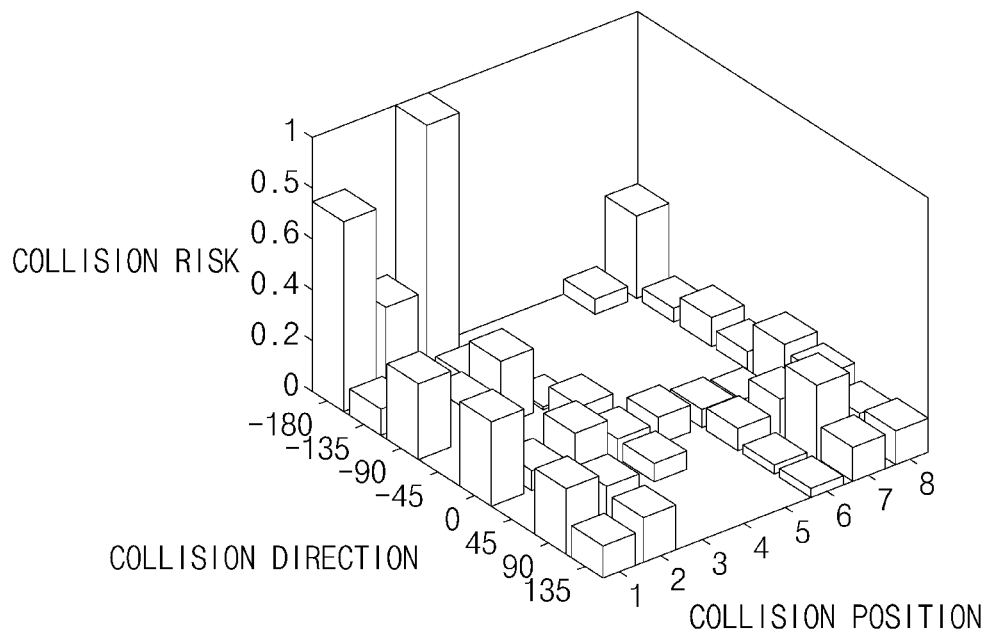
FIG. 3B is a graph illustrating a collision risk according to a collision direction and a collision position of an accident vehicle.

FIG. 3A is a drawing illustrating a collision direction and a collision position of an accident vehicle. FIG. 3B is a graph illustrating a collision risk according to a collision direction and a collision position of an accident vehicle.

As shown in FIG. 3A, a collision position of an accident vehicle may be divided and displayed into 8 positions with reference to the center Δ of the vehicle. For example, reference number 1 may indicate the front of the vehicle. Reference number 2 may indicate the right front of the vehicle. Reference number 3 may indicate the right of the vehicle. Reference number 4 may indicate the right rear of the vehicle. Reference number 5 may indicate the rear of the vehicle. Reference number 6 may indicate the left rear of the vehicle. Reference number 7 may indicate the left of the vehicle. Reference number 8 may indicate the left front of the vehicle.

Furthermore, a collision direction of the accident vehicle may be displayed as 360 degrees with respect to the center of the vehicle. For example, 0 degree may indicate a collision from the rear of the vehicle. 45 degrees may indicate a collision from the left rear of the vehicle. 90 degrees may indicate a collision from the left of the vehicle. 135 degrees may indicate a collision from the front left of the vehicle. 180 degrees may indicate a collision from the front of the vehicle. −135 degrees may indicate a collision from the right front of the vehicle. −90 degrees may indicate a collision from the right of the vehicle. −45 degrees may indicate a collision from the right rear of the vehicle.

As shown in FIG. 3B, a collision severity of a vehicle may be calculated based on the number of traffic fatalities which occur based on a collision direction and a collision position of the vehicle. The collision severity of the vehicle may be calculated as a value between 0 and 1. It is preferably understood that, the higher the collision risk, the more the number of traffic fatalities which occur in a corresponding direction and position, and that, the lower the collision risk, the less the number of traffic fatalities which occur in the corresponding direction and position.

A server 200 of FIG. 1 may calculate an accident severity index based on the number of found traffic fatalities and a collision risk. The accident severity index may be calculated as a numeric value between 0 and 100 by applying a weight to the number of traffic fatalities and the collision risk. One form of the present disclosure is exemplified as the server 200 calculates the accident severity index. However, forms are not limited thereto. For example, a controller 50 of FIG. 1 may obtain the number of traffic fatalities and a collision risk from the server 200 to calculate an accident severity index.

The controller 50 may calculate a time to collision (TTC) with another vehicle based on a position and speed of the other vehicle, sensed by the sensor 20. Furthermore, the controller 50 may obtain the calculated accident severity index from the server 200 and may calculate a first weighted time to collision wTTC_1 in which the accident severity index is reflected. The first weighted time to collision wTTC_1 in which the accident severity index is reflected may refer to a time calculated by reflecting the accident severity index in a time taken for a host vehicle to collide with another vehicle.

According to an exemplary form, the first weighted time to collision wTTC_1 may be calculated using Equation 1 below.

$$wTTC\_1 = (100 - G2 * \text{accident severity index}) * TTC / G1 \quad \text{[Equation 1]}$$

Herein, G1 and G2 may denote tuning gains, TTC may denote a time to collision calculated based on information sensed by the sensor 20, and wTTC_1 may be less than TTC.

In calculating the first weighted time to collision wTTC_1 in which the accident severity index is reflected, the controller 50 may tune G1 and G2 values to have a value less than the time to collision TTC calculated based on the information sensed by the sensor 20.

For example, when the accident severity index is calculated as 100, the controller 50 may tune G1 and G2 values as 0≤G2<1 and 100(1−G2)<G1. When the accident severity index is calculated as 50, the controller 50 may tune G1 and G2 values as 0≤G2<2 and 100(1−G2/2)<G1. When the accident severity index is calculated as 1, the controller 50 may tune G1 and G2 values as 0≤G2<100 and 100−G2<G1.

When calculating the first weighted time to collision wTTC_1 in which the accident severity index is reflected, the controller 50 may compare the calculated first weighted time to collision wTTC_1 with a first time and a second time. Herein, each of the first time and the second time may be the time to collision TTC calculated based on the information sensed by the sensor 20. The first time may refer to a time longer than the second time. Herein, it may be understood that, the longer the time to collision (TTC), the easier it is to avoid a collision.

The controller 50 may determine whether the first weighted time to collision wTTC_1 in which the accident severity index is reflected is greater than the first time. When it is determined that the first weighted time to collision wTTC_1 in which the accident severity index is reflected is greater than the first time, the controller 50 may turn on a warning light or may output a warning sound to notify a driver that an accident may occur.

The controller 150 may determine whether the first weighted time to collision wTTC_1 in which the accident severity index is reflected is greater than the second time and is less than or equal to the first time. When it is determined that the first weighted time to collision wTTC_1 in which the accident severity index is reflected is greater than the second time and is less than or equal to the first time, the controller 50 may reduce engine power or may generate a braking jerk (i.e., an environment where the vehicle jerks) to warn the driver.

The controller 50 may determine whether the first weighted time to collision wTTC_1 in which the accident severity index is reflected is less than or equal to the second time. When it is determined that the first weighted time to collision wTTC_1 in which the accident severity index is reflected is greater than the second time, the controller 50 may recalculate a first weighted time to collision wTTC_1 in which an accident severity index is reflected.

When the first weighted time to collision wTTC_1 in which the accident severity index is reflected is less than or equal to the second time, the controller 50 may determine whether a driver steers to avoid a collision. When it is determined that there is no driver steering input, the controller 50 may control braking torque to decelerate. Herein, the deceleration may refer to maximum deceleration and may refer to deceleration when braking with a maximum force.

Meanwhile, when it is determined that there is the driver steering input, the controller 50 may calculate a second weighted time to collision wTTC_2 in which an accident severity index is reflected upon deceleration in a state where the driver steers and a third weighted time to collision wTTC_3 in which an accident severity index is reflected upon deceleration in a state where the driver does not steer and may compare the second weighted time to collision wTTC_2 with the third weighted time to collision wTTC_3.

Herein, the second weighted time to collision wTTC_2 in which the accident severity index is reflected upon the deceleration in the state where the driver steers may refer to a time taken to collide with another vehicle upon deceleration in a steered direction when the driver steers to avoid a collision. The third weighted time to collision wTTC_3 in which the accident severity index is reflected upon the deceleration in the state where the driver does not steer may refer to a time taken to collide with another vehicle upon deceleration in an original driving direction in which the driver does not steer.

When it is determined that the second weighted time to collision wTTC_2 in which the accident severity index is reflected upon the deceleration in the state where the driver steers is greater than the third weighted time to collision wTTC_3 in which the accident severity index is reflected upon the deceleration in the state where the driver does not steer, the controller 50 may control steering torque to assist the driver to steer in the direction where he or she steers and may control braking torque to decelerate the vehicle.

This may mean that the controller 50 determines that a time taken to collide with another vehicle as a host vehicle decelerates in a direction where the driver steers is longer than a time taken to collide with the other vehicle as the host vehicle decelerates with a maximum force in its original driving direction. In this case, the controller 50 may control steering torque to steer in a direction where the driver steers and may assist the driver to steer to avoid a collision with the other vehicle.

When it is determined that the second weighted time to collision wTTC_2 in the accident severity index is reflected upon the deceleration in the state where the driver steers is less than or equal to the third weighted time to collision wTTC_3 in the accident severity index is reflected upon the deceleration in the state where the driver does not steer, the controller 50 may control steering torque in a direction opposite to a direction where the driver steers and may control braking torque to decelerate the vehicle.

This may mean that the controller 50 determines that a time taken to collide with another vehicle as the host vehicle travels in a direction where the driver steers is shorter than a time taken to collide with the other vehicle as the host vehicle decelerates in its original driving direction. In this case, the controller 50 may control steering torque not to steer in a direction where the driver steers and may suppress a driver steering input to avoid the collision with the other vehicle.

According to another form of the present disclosure, the controller 50 may control a smart cruise control setting speed using a calculated accident severity. For example, the controller 50 may control to decelerate to a set speed based on the accident severity. In other words, the controller 50 may set a smart cruise control speed based on an accident severity in which the number of traffic fatalities and a collision risk are reflected, rather than setting speed based on a position and speed of another vehicle, sensed by the sensor 20, thus preventing a collision with another vehicle incapable of being sensed by the sensor 20 and rapid braking to avoid the collision.

Figure 4:
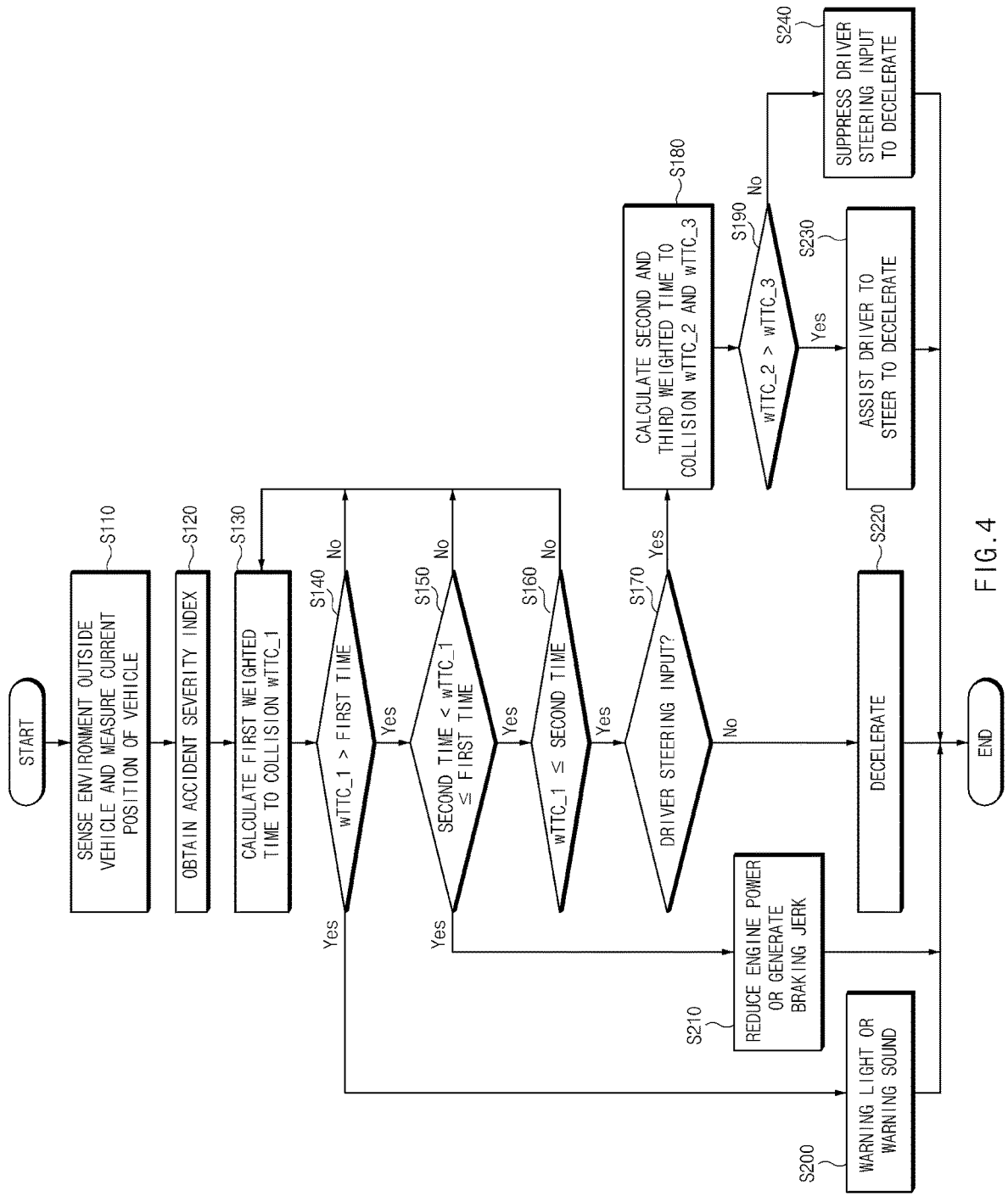
FIG. 4 is a flowchart illustrating a method for controlling driving of a vehicle.

FIG. 4 is a flowchart illustrating a method for controlling driving of a vehicle according to another exemplary form of the present disclosure.

As shown in FIG. 4, in operation S110, a sensor 20 of FIG. 1 may sense an environment outside a vehicle and a positioning device 30 of FIG. 1 may measure a current position of the vehicle. Herein, the environment outside the vehicle may include brightness, an obstruction, weather, or the like outside the vehicle.

In operation S120, a controller 50 of FIG. 1 may obtain an accident severity index calculated from a server 200 of FIG. 1 based on the environment outside the vehicle, sensed by the sensor 20, and the current position of the vehicle, measured by the positioning device 30. The accident severity index may be calculated based on the number of accident fatalities which occur in the environment outside the vehicle and the current position of the vehicle and a collision risk.

In operation S130, the controller 50 may calculate a first weighted time to collision wTTC_1 in which the accident severity index is reflected.

In operation S140, the controller 50 may determine whether the first weighted time to collision wTTC_1 in which the accident severity index is reflected is greater than a first time. Herein, the first time may refer to a time to collision calculated based on information sensed by the sensor 20.

When it is determined that the first weighted time to collision wTTC_1 in which the accident severity index is reflected is greater than the first time in operation S140 (Yes), in operation S200, the controller 50 may turn on a warning light or may output a warning sound. When it is determined that the first weighted time to collision wTTC_1 in which the accident severity index is reflected is less than or equal to the first time in operation S140 (No), the controller 50 may perform operation S130.

In operation S150, the controller 50 may determine whether the first weighted time to collision wTTC_1 in which the accident severity index is reflected is greater than a second time and is less than or equal to the first time. Herein, the second time may refer to a time shorter than the first time.

When it is determined that the first weighted time to collision wTTC_1 in which the accident severity index is reflected is greater than the second time and is less than or equal to the first time in operation S150 (Yes), in operation S210, the controller 50 may reduce engine power and may generate a braking jerk (i.e., a phenomenon in which the vehicle jerks). When it is determined that the first weighted time to collision wTTC_1 in which the accident severity index is reflected is less than or equal to the second time and is greater than the first time in operation S150 (No), the controller 50 may perform operation S130.

In operation S160, the controller 50 may determine whether the first weighted time to collision wTTC_1 in which the accident severity index is reflected is less than or equal to the second time. When it is determined that the first weighted time to collision wTTC_1 in which the accident severity index is reflected is less than or equal to the second time in operation S160 (Yes), in operation S170, the controller 50 may determine whether there is a driver steering input. When it is determined that the first weighted time to collision wTTC_1 in which the accident severity index is reflected is greater than the second time in operation S160 (No), the controller 50 may perform operation S130.

When it is determined that there is no the driver steering input in operation S170, in operation S220, the controller 50 may control braking torque to decelerate. The deceleration in operation S220 may refer to maximum deceleration and may refer to deceleration when braking with a maximum force.

Meanwhile, when it is determined there is the driver steering input in operation S170 (Yes), in operation S180, the controller 50 may calculate a second weighted time to collision wTTC_2 in which an accident severity index is reflected upon deceleration in a state where the driver steers and a third weighted time to collision wTTC_3 in which an accident severity index is reflected upon deceleration in a state where the driver does not steer.

In operation S190, the controller 50 may determine whether the second weighted time to collision wTTC_2 in which the accident severity index is reflected upon the deceleration in the state where the driver steers is greater than the third weighted time to collision wTTC_3 in which the accident severity index is reflected upon the deceleration in the state where the driver does not steer.

When it is determined that the second weighted time to collision wTTC_2 in which the accident severity index is reflected upon the deceleration in the state where the driver steers is greater than the third weighted time to collision wTTC_3 in which the accident severity index is reflected upon the deceleration in the state where the driver does not steer in operation S190 (Yes), in operation S230, the controller 50 may control steering torque in the same direction as a direction where the driver steers to assist the driver to steer and may control braking torque to decelerate.

When it is determined that the second weighted time to collision wTTC_2 in which the accident severity index is reflected upon the deceleration in the state where the driver steers is less than or equal to the third weighted time to collision wTTC_3 in which the accident severity index is reflected upon the deceleration in the state where the driver does not steer in operation S190 (No), in operation S240, the controller 50 may control steering torque in a direction opposite to a direction where the driver steers to suppress the driver steering input and may control braking torque to decelerate.

Figure 5A:
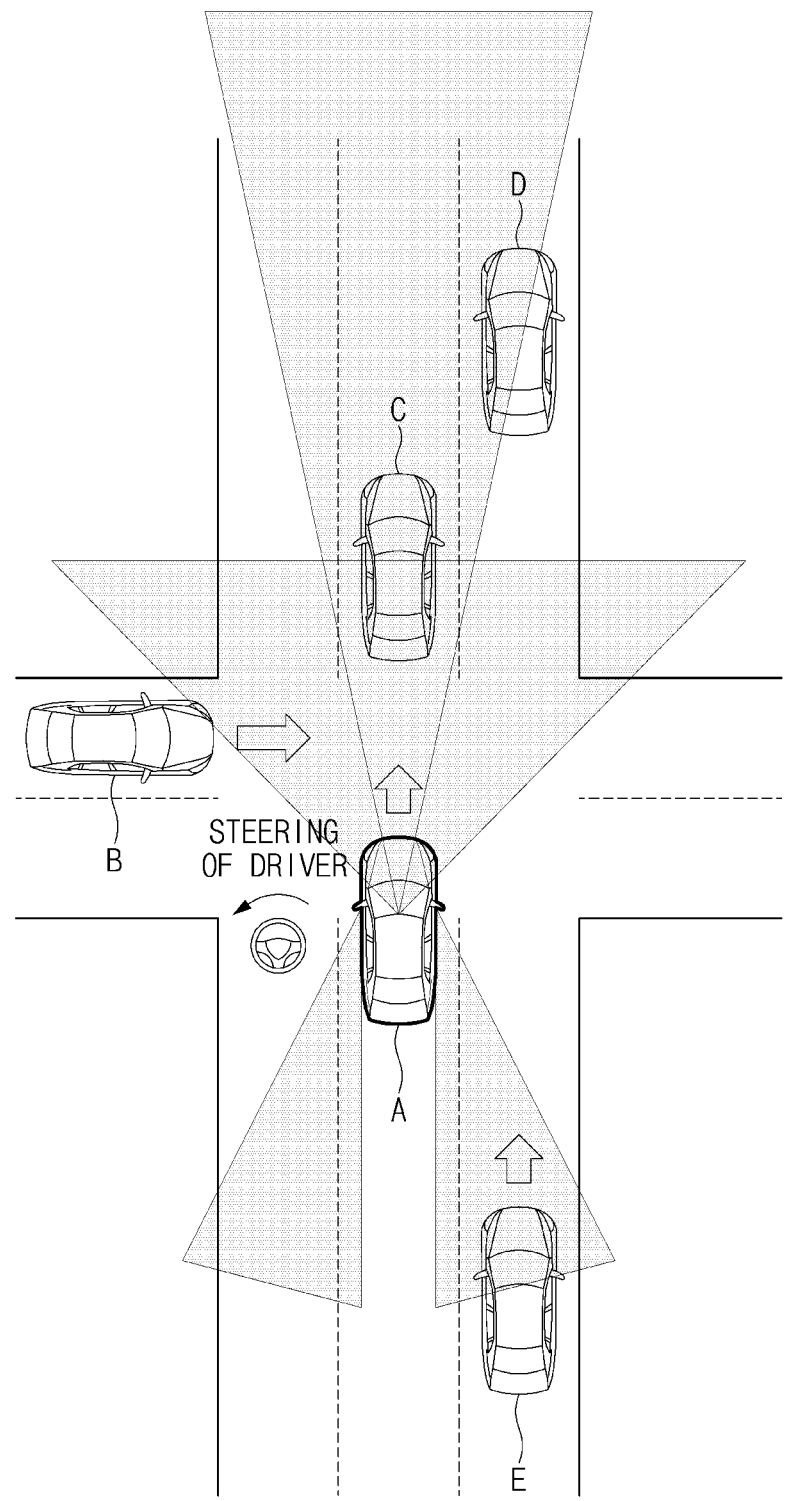
FIG. 5A is a drawing illustrating a host vehicle which enters an intersection and other vehicles.
Figure 5B:
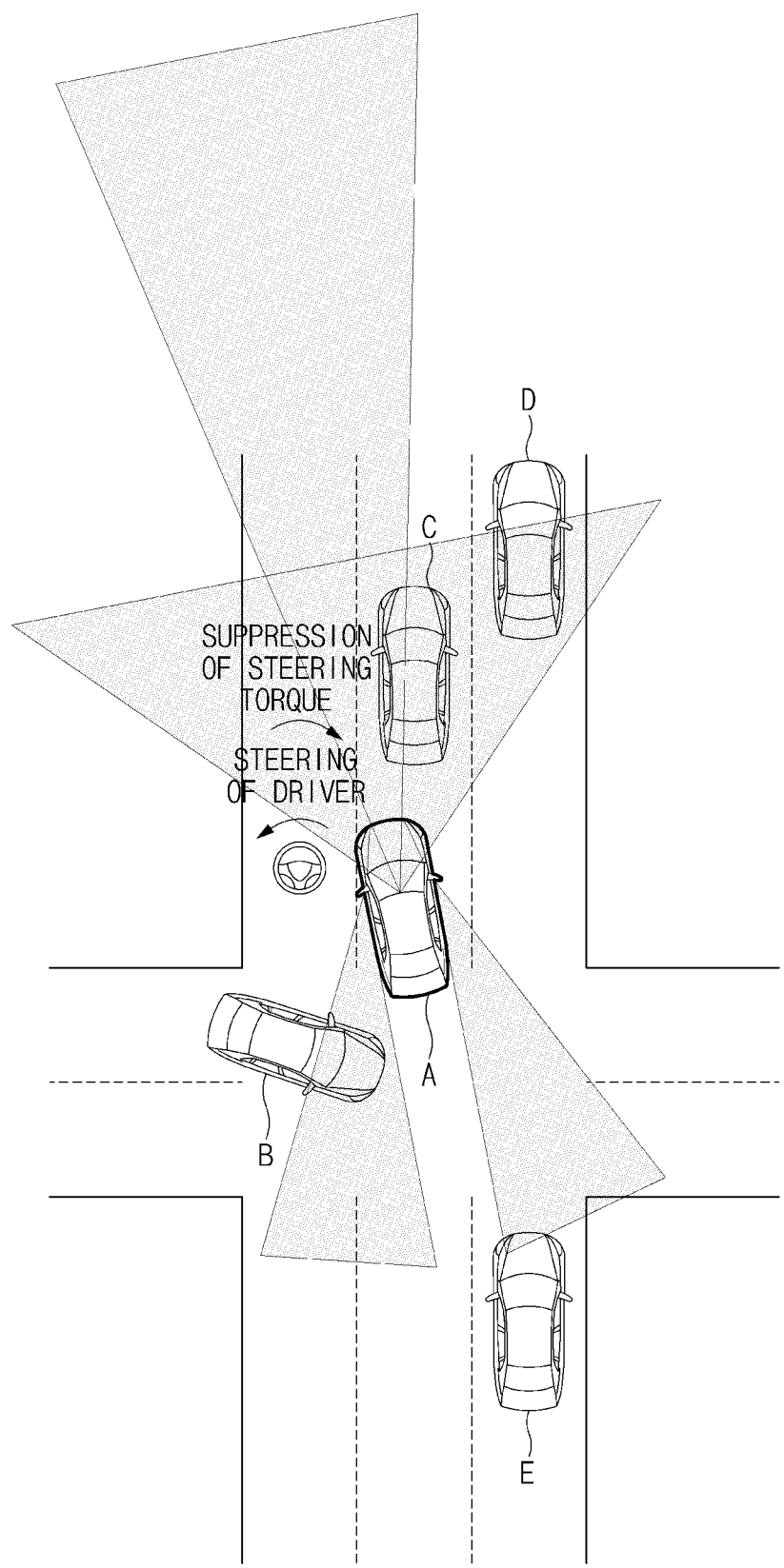
FIG. 5B is a drawing schematically illustrating collision avoidance of a host vehicle which enters an intersection as steering of a driver is suppressed.

FIG. 5A is a drawing illustrating a host vehicle which enters an intersection and other vehicles. FIG. 5B is a drawing schematically illustrating collision avoidance of a host vehicle which enters an intersection as steering of a driver is suppressed.

Referring to FIG. 5A, a host vehicle A is entering in the direction of 6 o'clock about an intersection. Another vehicle B is entering in the direction of 9 o'clock about the intersection. Other vehicles C and D are traveling in front of the host vehicle A. Another vehicle E is traveling behind the host vehicle A.

A controller 50 of FIG. 1 may obtain an accident severity index calculated based on the number of traffic fatalities which occur at the intersection, measured in a current position of the host vehicle A by a positioning device 30 of FIG. 1, and a collision risk. According to one form, an accident severity index of the other vehicle B may be 80. An accident severity index of the other vehicle C may be 60. An accident severity index of the other vehicle D may be 30. An accident severity index of the other vehicle E may be 20.

When it is determined that the other vehicle B is entering in the direction of 9 o'clock about the intersection and the other vehicles C and D decelerate based on information sensed by a sensor 20 of FIG. 1, the controller 50 may calculate a first weighted time to collision wTTC_1 in which an accident severity index is reflected, based on a position, speed, or the like of each of the other vehicles B and C, sensed by the sensor 20.

Furthermore, when it is determined that the driver steers in a counterclockwise direction to avoid a collision, the controller 50 may determine a second weighted time to collision wTTC_2 in which an accident severity index is reflected upon deceleration in a state where the driver steers and a third weighted time to collision wTTC_3 in which an accident severity index is reflected upon deceleration in a state where the driver does not steer. Herein, the second weighted time to collision wTTC_2 and the third weighted time to collision wTTC_3 may refer to a time to collision with the other vehicle B.

The controller 50 may compare the second weighted time to collision wTTC_2 in which the accident severity index is reflected upon the deceleration in the state where the driver steers with the third weighted time to collision wTTC_3 in which the accident severity index is reflected upon the deceleration in the state where the driver does not steer. When it is determined that the second weighted time to collision wTTC_2 in which the accident severity index is reflected upon the deceleration in the state where the driver steers is less than or equal to the third weighted time to collision wTTC_3 in which the accident severity index is reflected upon the deceleration in the state where the driver does not steer, as shown in FIG. 5B, the controller 50 may control steering torque in a direction opposite to a direction in which the driver steers to suppress a driver steering input to decelerate. Thus, the host vehicle A may avoid a collision with the other vehicle B.

Figure 6A:
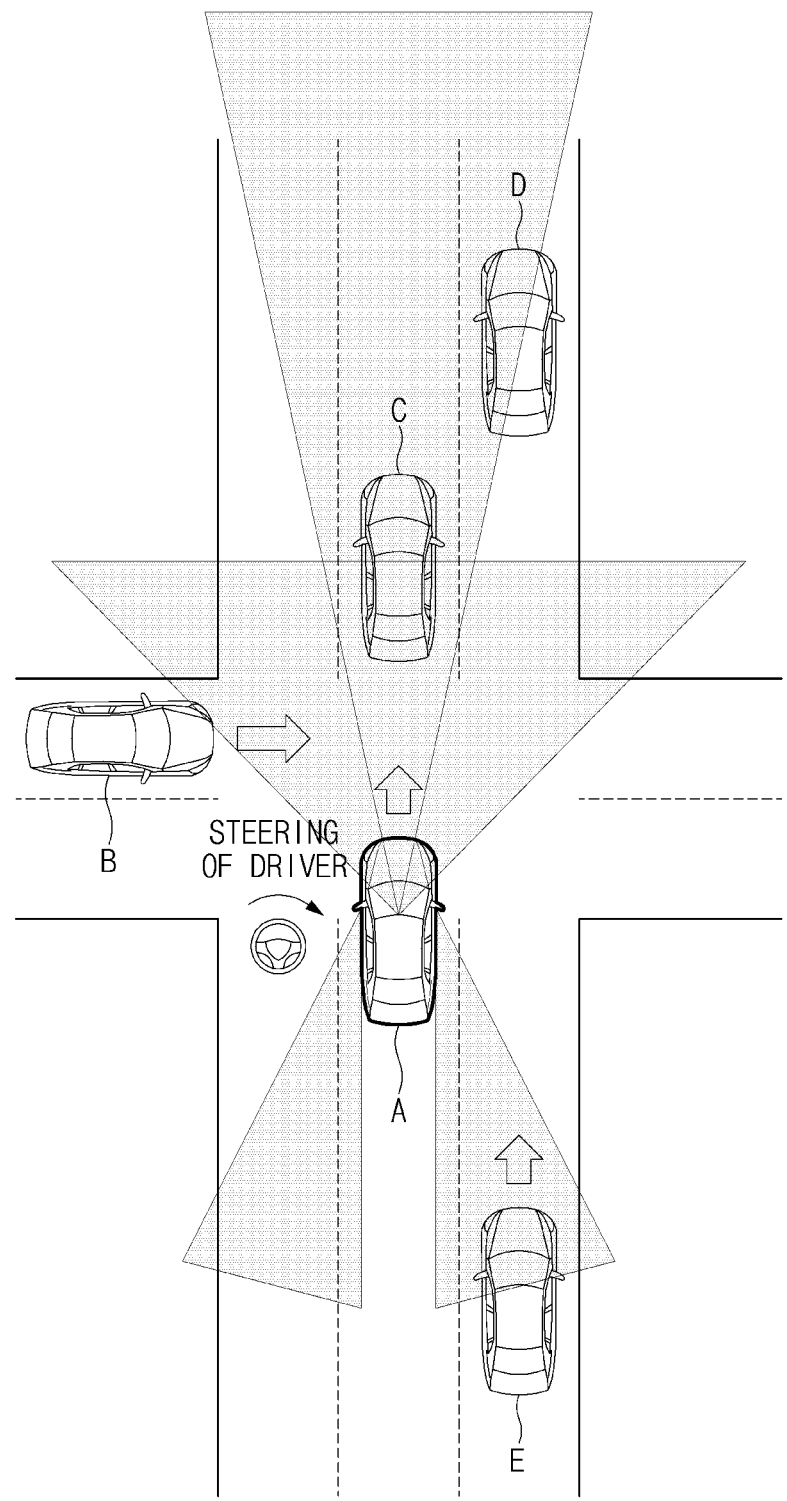
FIG. 6A is a drawing illustrating a host vehicle which enters an intersection and other vehicles.
Figure 6B:
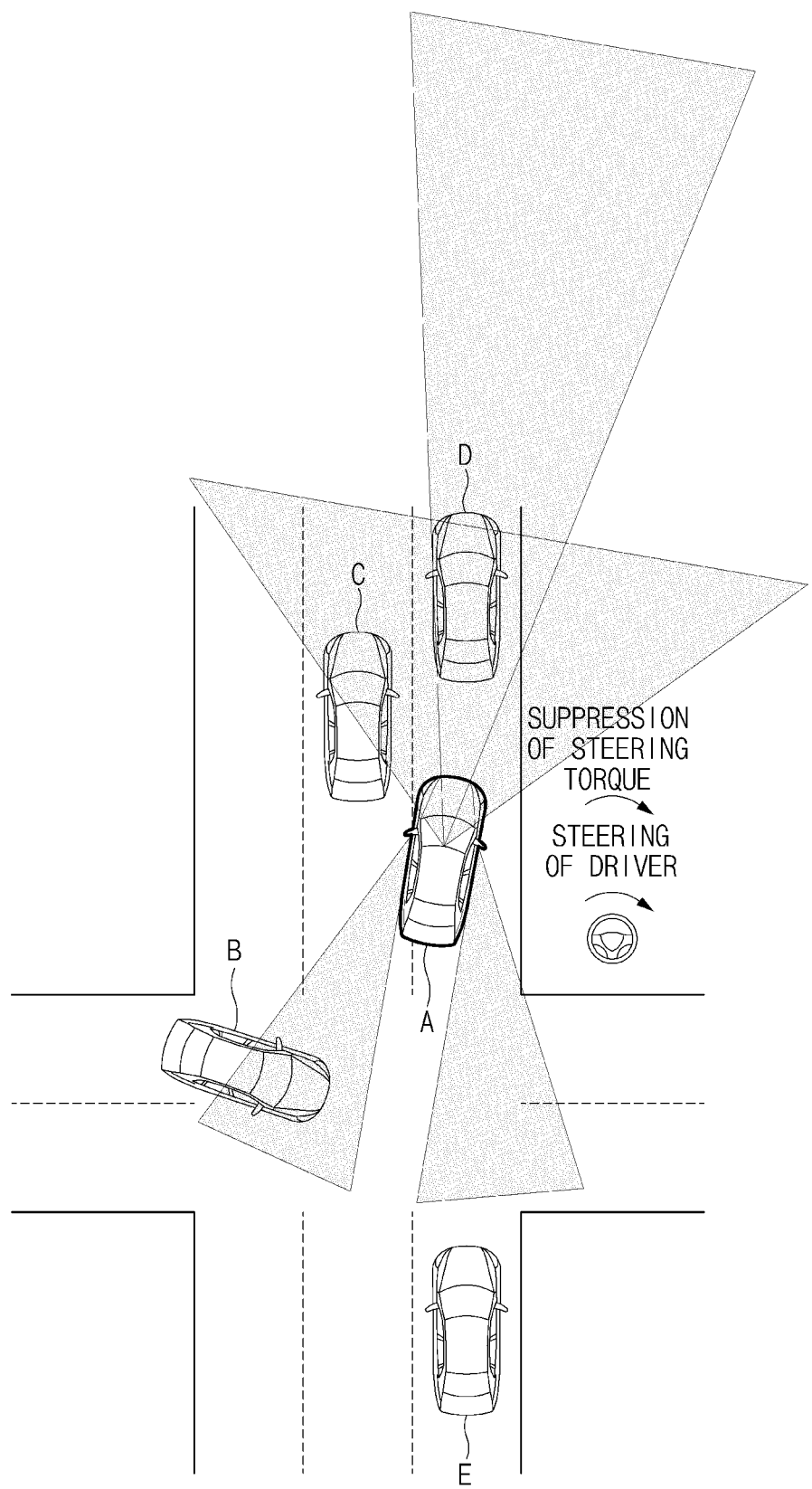
FIG. 6B is a drawing schematically illustrating collision avoidance of a host vehicle which enters an intersection as steering of a driver is assisted.

FIG. 6A is a drawing illustrating a host vehicle which enters an intersection and other vehicles. FIG. 6B is a drawing schematically illustrating collision avoidance of a host vehicle which enters an intersection as steering of a driver is assisted.

Referring to FIG. 6A, a host vehicle A is entering in the direction of 6 o'clock about an intersection. Another vehicle B is entering in the direction of 9 o'clock about the intersection. Other vehicles C and D are traveling in front of the host vehicle A. Another vehicle E is traveling behind the host vehicle A.

A controller 50 of FIG. 1 may obtain an accident severity index calculated based on the number of traffic fatalities which occur at the intersection, measured in a current position of the host vehicle A by a positioning device 30 of FIG. 1, and a collision risk.

When it is determined that the other vehicle B is entering in the direction of 9 o'clock about the intersection and the other vehicles C and D decelerate based on information sensed by a sensor 20 of FIG. 1, the controller 50 may calculate a first weighted time to collision wTTC_1 in which an accident severity index is reflected, based on a position, speed, or the like of each of the other vehicles B and C, sensed by the sensor 20.

Furthermore, when it is determined that the driver steers in a clockwise direction to avoid a collision, the controller 50 may determine a second weighted time to collision wTTC_2 in which an accident severity index is reflected upon deceleration in a state where the driver steers and a third weighted time to collision wTTC_3 in which an accident severity index is reflected upon deceleration in a state where the driver does not steer.

The controller 50 may compare the second weighted time to collision wTTC_2 in which the accident severity index is reflected upon the deceleration in the state where the driver steers with the third weighted time to collision wTTC_3 in which the accident severity index is reflected upon the deceleration in the state where the driver does not steer. When it is determined that the second weighted time to collision wTTC_2 in which the accident severity index is reflected upon the deceleration in the state where the driver steers is greater than the third weighted time to collision wTTC_3 in which the accident severity index is reflected upon the deceleration in the state where the driver does not steer, as shown in FIG. 6B, the controller 50 may control steering torque in the same direction as a direction in which the driver steers to assist the driver to steer to decelerate. Thus, the host vehicle A may avoid a collision with the other vehicle B.

Figure 7A:
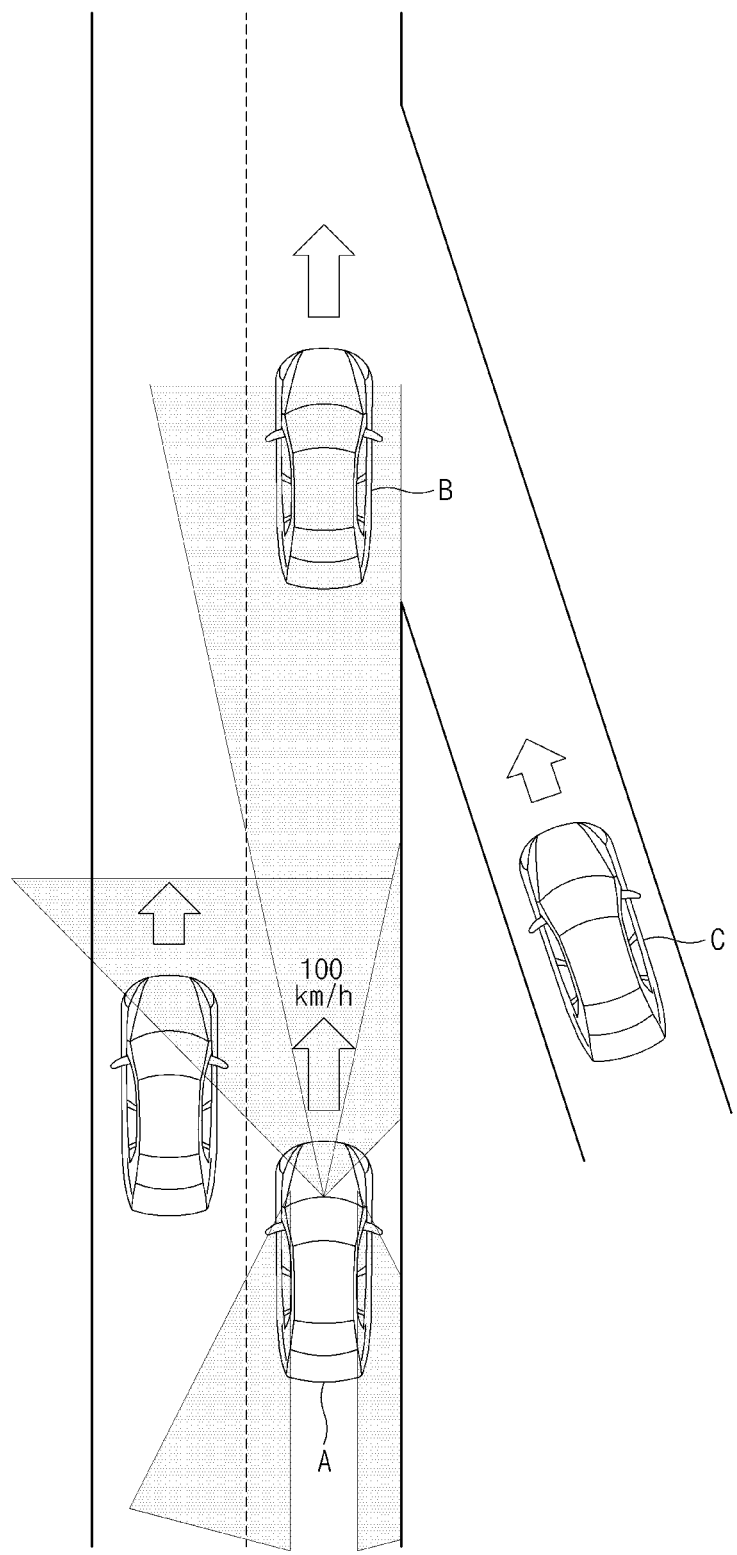
FIG. 7A is a drawing illustrating a host vehicle which is traveling on a right merge road and other vehicles.
Figure 7B:
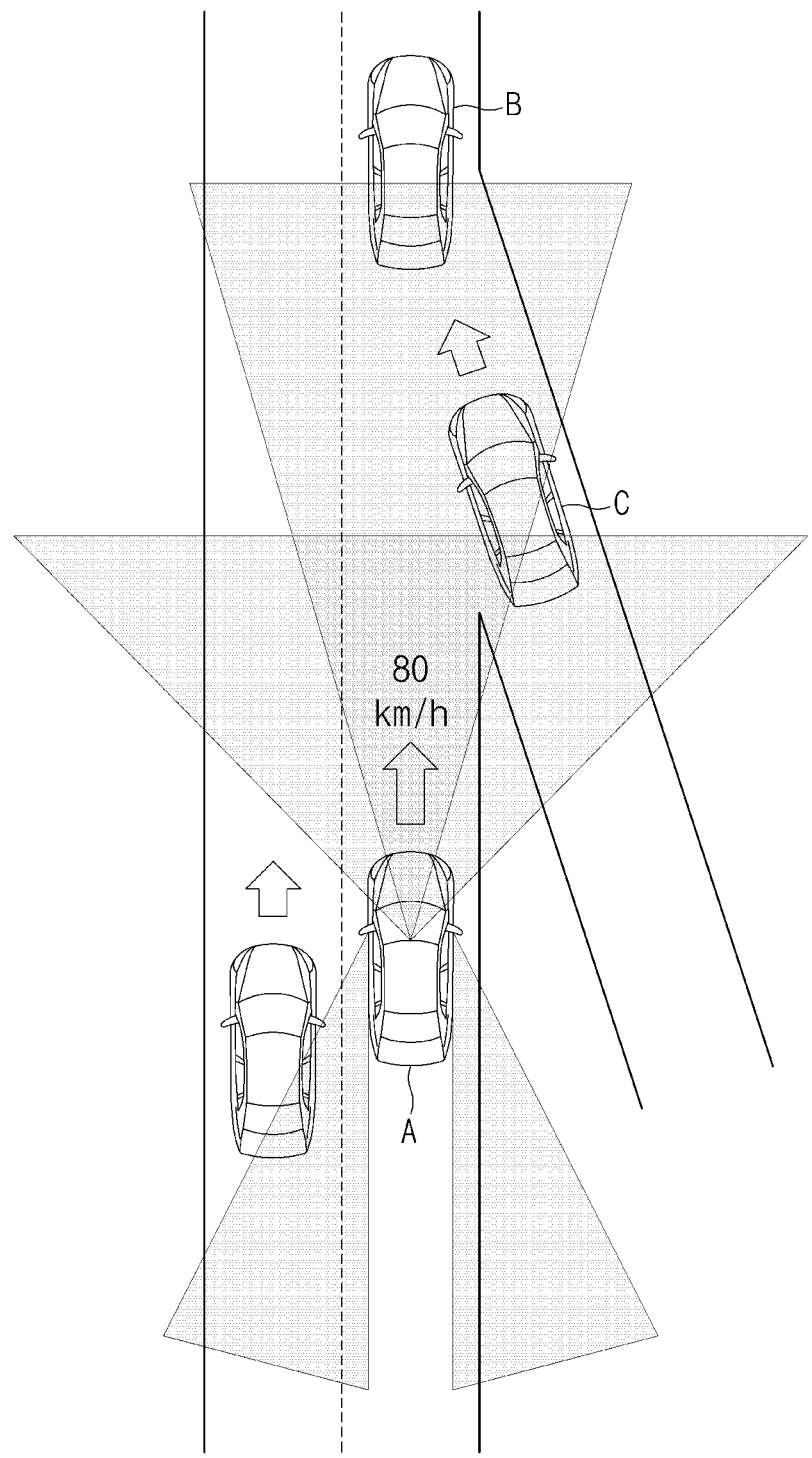
FIG. 7B is a drawing schematically illustrating collision avoidance of a host vehicle which is traveling on a right merge road as a smart cruise control setting speed is controlled.

FIG. 7A is a drawing illustrating a host vehicle which is traveling on a right merge road and other vehicles. FIG. 7B is a drawing schematically illustrating collision avoidance of a host vehicle which is traveling on a right merge road as a smart cruise control setting speed is controlled.

As shown in FIG. 7A, a sensor 20 of FIG. 1 may sense another vehicle B which is traveling in front of a host vehicle A. A positioning device 30 of FIG. 1 may measure that the host vehicle A is located on a right merge road. The controller 50 may set a smart cruise control speed based on information of the other vehicle B, sensed by the sensor 20. However, the sensor 20 may fail to sense another vehicle C which is traveling on a right merge road.

In one form of the present disclosure, the controller 50 may obtain an accident severity index calculated based on the number of traffic fatalities, which occur in an environment where there is a right merge road, and a collision risk from a server 200 of FIG. 1 and may reflect the accident severity index in setting a smart cruise control speed. In other words, although the sensor 20 does not sense the other vehicle C, the controller 50 may previously decelerate and set a smart cruise control speed by reflecting the accident severity index.

Thus, as shown in FIG. 7B, the controller 50 may prevent a collision with the other vehicle C which merges suddenly at a right merge point.

Figure 8:
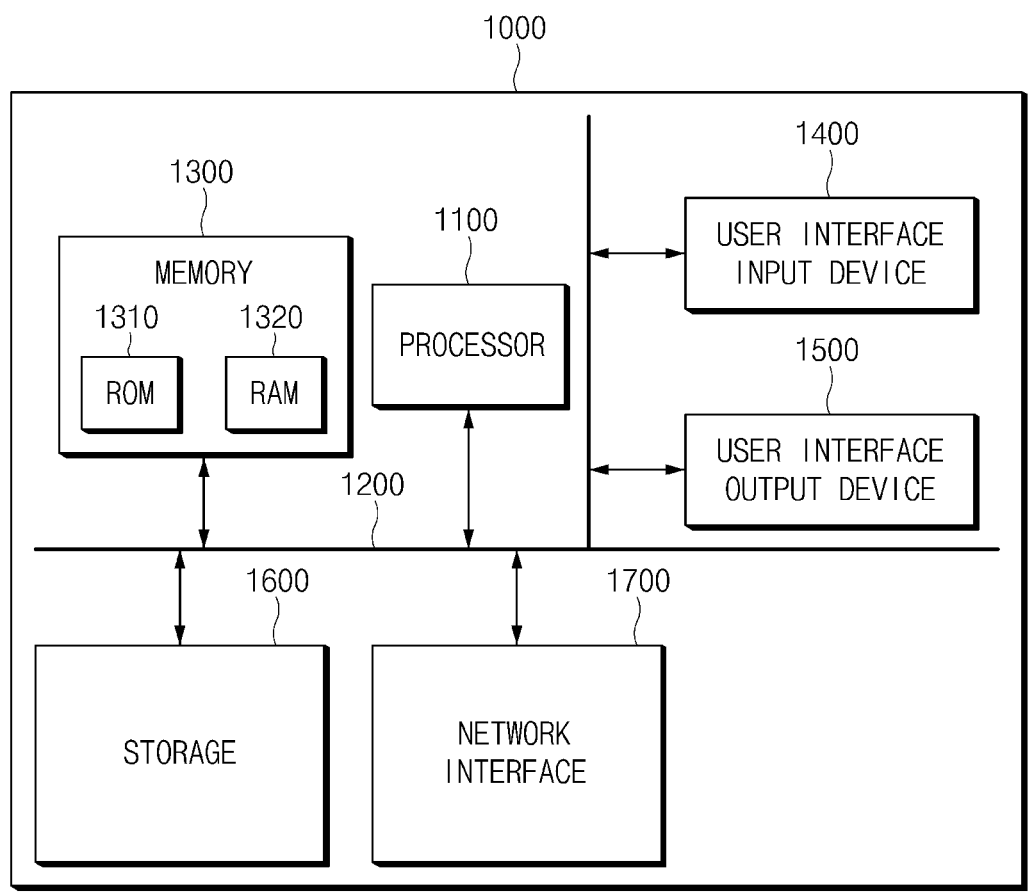
FIG. 8 is a block diagram illustrating a configuration of a computing system which executes a method.

FIG. 8 is a block diagram illustrating a configuration of a computing system which executes a method in one form of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus and method for controlling driving of the vehicle according to exemplary forms of the present disclosure may calculate a time to collision in which an accident severity obtained from the server is reflected, based on an accident risk according to the number of traffic fatalities in the past and a relative position and may adjust a time when the vehicle is controlled and an amount of control of the vehicle, other than sensing an external environment based on a sensor in the related art, thus performing strong control to avoid a collision in an external environment incapable of being sensed by the sensor and reducing occurrence of an accident of the vehicle and damage according to the accident of the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus for controlling driving of a vehicle, the apparatus comprising:
   a sensor configured to sense an environment outside of the vehicle;
   a positioning device configured to measure a current position of the vehicle; and
   a controller configured to calculate a first weighted time to collision with another vehicle based on an accident severity index obtained based on the environment outside of the vehicle and the current position of the vehicle and to control collision avoidance based on the calculated first weighted time to collision,
   wherein:
      the accident severity index is calculated based on a number of fatalities which occur in the environment outside of the vehicle, the current position of the vehicle and a collision risk, and
      the collision risk is calculated based on the number of fatalities according to a collision position and a collision direction of an accident vehicle which occurs in the current position of the vehicle.

2. The apparatus of claim 1, wherein the environment outside of the vehicle comprises at least one of brightness, an obstruction, or weather outside of the vehicle.

3. The apparatus of claim 1, wherein the controller is configured to:
   control at least one of a warning light and a warning sound, when the first weighted time to collision is greater than a first time.

4. The apparatus of claim 3, wherein the controller is configured to:
   reduce engine power or generate a braking jerk, when the first weighted time to collision is greater than a second time and is less than or equal to the first time.

5. The apparatus of claim 4, wherein the controller is configured to:
   control braking torque to decelerate, when the first weighted time to collision is less than or equal to the second time and when there is no driver steering input.

6. The apparatus of claim 5, wherein the controller is configured to:
   calculate a second weighted time to collision in which the accident severity index is reflected upon deceleration in a state where a driver steers; and
   calculate a third weighted time to collision in which the accident severity index is reflected upon deceleration in a state where the driver does not steer, when the first weighted time to collision is less than or equal to the second time and when there is the driver steering input.

7. The apparatus of claim 6, wherein the controller is configured to:
   assist the driver to steer to decelerate, when the second weighted time to collision is greater than the third weighted time to collision.

8. The apparatus of claim 6, wherein the controller is configured to:

suppress the driver steering input to decelerate, when the second weighted time to collision is less than or equal to the third weighted time to collision.

9. The apparatus of claim 1, wherein the controller is configured to:
control a smart cruise control setting speed based on the accident severity index.

10. A method for controlling driving of a vehicle, the method comprising:
sensing, by a sensor, an environment outside of the vehicle;
measuring, by a positioning device, a current position of the vehicle;
obtaining, by a controller, an accident severity index based on the environment outside of the vehicle and the current position of the vehicle;
calculating, by the controller, a first weighted time to collision with another vehicle based on the accident severity index; and
controlling, by the controller, collision avoidance based on the first weighted time to collision,
wherein:
the accident severity index is calculated based on a number of fatalities which occur in the environment outside of the vehicle and the current position of the vehicle and a collision risk, and
the collision risk is calculated based on the number of fatalities according to a collision position and a collision direction of an accident vehicle which occurs in the current position of the vehicle.

11. The method of claim 10, wherein the controlling collision avoidance comprises:
controlling at least one of a warning light or a warning sound, when the first weighted time to collision is greater than a first time.

12. The method of claim 11, wherein the controlling collision avoidance comprises:
reducing engine power or generating a braking jerk, when the first weighted time to collision in which the accident severity index is reflected is greater than a second time and is less than or equal to the first time.

13. The method of claim 12, wherein the controlling collision avoidance comprises:
controlling a braking torque to decelerate, when the first weighted time to collision in which the accident severity index is reflected is less than or equal to the second time and when there is no driver steering input.

14. The method of claim 13, wherein the controlling collision avoidance comprises:
calculating a second weighted time to collision in which the accident severity index is reflected upon deceleration in a state where a driver steers; and
calculating a third weighted time to collision in which the accident severity index is reflected upon deceleration in a state where the driver does not steer, when the first weighted time to collision in which the accident severity index is reflected is less than or equal to the second time and when there is a driver steering input.

15. The method of claim 14, further comprising:
assisting, by the controller, the driver to steer to decelerate, when the second weighted time to collision is greater than the third weighted time to collision.

16. The method of claim 14, further comprising:
suppressing, by the controller, the driver steering input to decelerate, when the second weighted time to collision is less than or equal to the third weighted time to collision.

* * * * *